(12) United States Patent
Louzoun et al.

(10) Patent No.: US 12,010,019 B2
(45) Date of Patent: Jun. 11, 2024

(54) CONCEPT FOR SEGMENTING AN APPLICATION BUFFER INTO DATA PACKETS

(71) Applicant: Intel Corporation, Santa Clara, CA (US)

(72) Inventors: Eliel Louzoun, Jerusalem (IL); Manasi Deval, Portland, OR (US); Stephen Doyle, Ennis (IE); Noam Elati, Zichron Yaakov (IL); Patrick Fleming, Laois (IE); Gregory Bowers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 17/648,196

(22) Filed: Jan. 18, 2022

(65) Prior Publication Data

US 2022/0141133 A1    May 5, 2022

Related U.S. Application Data

(63) Continuation of application No. 16/414,814, filed on May 17, 2019.

(60) Provisional application No. 62/673,167, filed on May 18, 2018.

(51) Int. Cl.
*H04L 45/74* (2022.01)
*H04L 47/36* (2022.01)
*H04L 49/90* (2022.01)

(52) U.S. Cl.
CPC .......... *H04L 45/74* (2013.01); *H04L 47/365* (2013.01); *H04L 49/90* (2013.01)

(58) Field of Classification Search
None
See application file for complete search history.

(56) References Cited

U.S. PATENT DOCUMENTS

| 2005/0147126 A1* | 7/2005 | Qiu | H04L 69/16 370/474 |
| 2018/0220322 A1* | 8/2018 | Atre | H04W 28/02 |

OTHER PUBLICATIONS

Iyengar et al. "QUIC: A UDP-Based Multiplexed and Secure Transport" Mar. 5, 2018 (Year: 2018).*

* cited by examiner

*Primary Examiner* — Robert M Morlan
(74) *Attorney, Agent, or Firm* — 2SPL Patent Attorneys PartG mbB; Kieran O'Leary

(57) ABSTRACT

An apparatus, a method, and a computer program for generating data packets according to a transport protocol from an application buffer comprising a plurality of data streams is provided. The apparatus comprises an input circuit configured to receive metadata comprising at least one of information about data packet types supported by the transport protocol, information about an offset and a length of the supported data packet types, and information about possible stream header start positions, possible payload start positions and possible offsets in the data streams. Further, the apparatus comprises a parsing circuit configured to identify offsets in an application buffer as possible segmentation points based on the metadata, to segment the application buffer at the possible segmentation points into segments for data packets, and to generate data packets according to the transport protocol based on the segments. Furthermore, an apparatus, a method and a computer program for processing the application buffer is provided.

17 Claims, 6 Drawing Sheets

CONCEPT FOR SEGMENTING AN APPLICATION BUFFER INTO DATA PACKETS

CROSS-REFERENCE TO RELATED APPLICATIONS

This application is a continuation of U.S. Application Ser. No. 16/414,814, filed on May 17, 2019. That application was a continuation of US Provisional Application 62/673,167, which was filed on May 18, 2018. The contents of the earlier filed applications are incorporated by reference herein in their entirety.

FIELD

Examples relate to a concept for segmenting an application buffer into data packets.

BACKGROUND

Many computer applications are based on transmitting information via a network, e.g. the internet. As many computer systems use a layered model for transmitting information (e.g. based on the Open Systems Interconnection model), the information that is to be transmitted may traverse a number of different processing levels until it is finally transmitted. One of the tasks to be undertaken in the transmission of this information over the network is a segmentation of the information that is to be transmitted into data packets.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
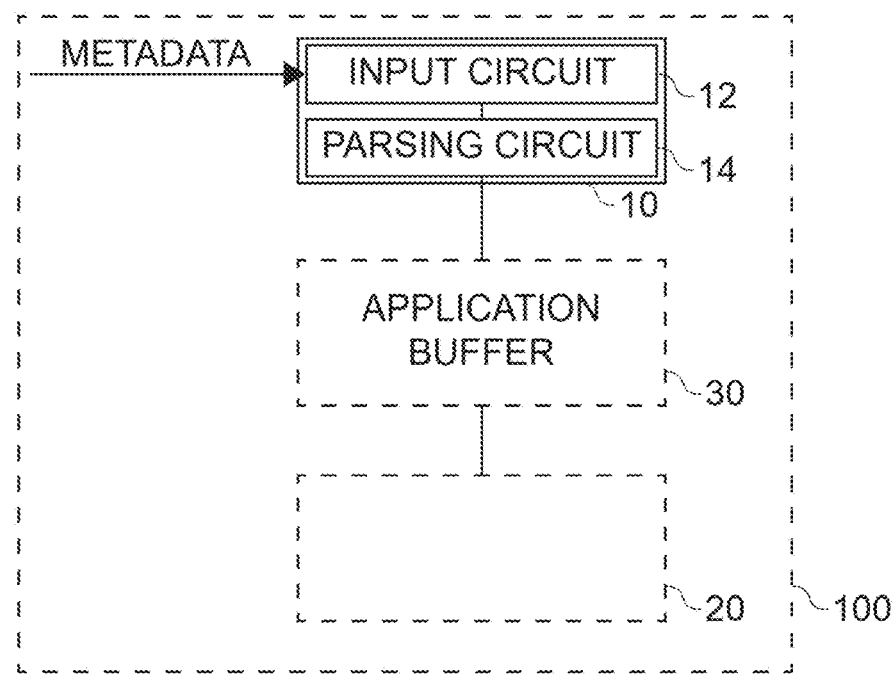
FIG. 1a illustrates a block diagram chart of an example of an apparatus for generating data packets according to a transport protocol.

FIG. 1a illustrates a block diagram chart of an example of an apparatus 10 for generating data packets according to a transport protocol from an application buffer 30 comprising a plurality of data streams. The apparatus 10 comprises an input circuit 12 configured to receive metadata comprising at least one of information about data packet types supported by the transport protocol, information about an offset and a length of the supported data packet types, and information about possible stream header start positions, possible payload start positions and possible offsets in the data streams. The apparatus 10 comprises a parsing circuit 14 that is coupled to the input circuit 12. Furthermore, the parsing circuit may be coupled to the application buffer, i.e. the parsing circuit may have access to the application buffer. The parsing circuit 14 is configured to identify offsets in the application buffer as possible segmentation points based on the metadata. The parsing circuit is configured to segment the application buffer at the possible segmentation points into segments for data packets. The parsing circuity is configured to generate data packets according to the transport protocol based on the segments. FIG. 1a further shows a computer system 100 comprising the apparatus 10, the application buffer 30 and an apparatus 20, which is introduced in connection with FIG. 2a.

Figure 1B:
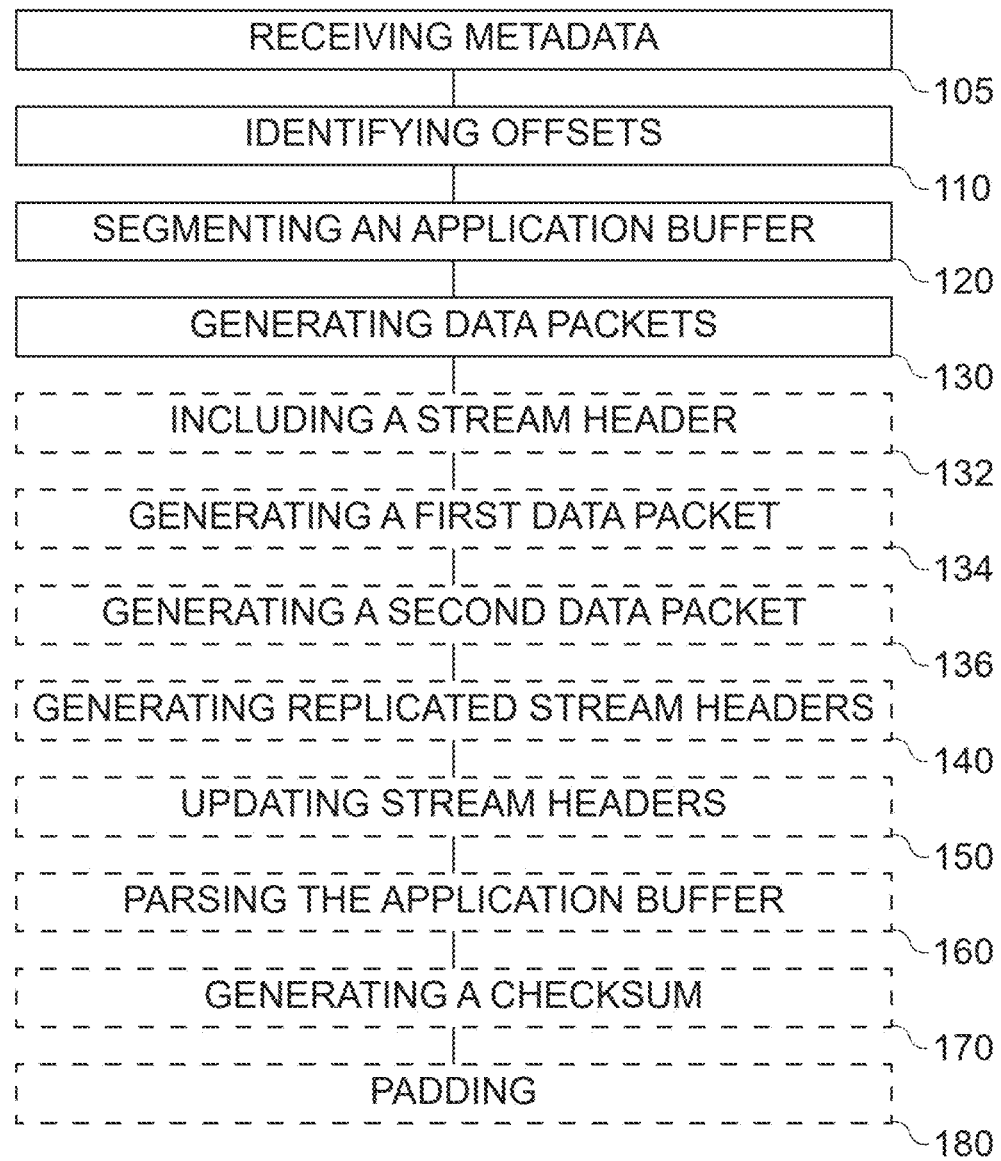
FIG. 1b illustrates a flow chart of an example of a method for generating data packets according to a transport protocol.

FIG. 1b illustrates a flow chart of an example of a (corresponding) method for generating data packets according to a transport protocol from an application buffer comprising a plurality of data streams. The method comprises receiving 105 metadata comprising at least one of information about data packet types supported by the transport protocol, information about an offset and a length of the supported data packet types, and information about possible stream header start positions, possible payload start positions and possible offsets in the data streams. The method comprises identifying 110 offsets in the application buffer as possible segmentation points based on the metadata. The method comprises segmenting 120 the application buffer at the possible segmentation points into segments for data packets. The method comprises generating 130 data packets according to the transport protocol based on the segments.

The following description relates to both the apparatus of FIG. 1a and the method of FIG. 1b. Features of the apparatus, such as capabilities of the parsing circuit, may also constitute features of the corresponding method.

At least some Examples relate to an apparatus and a method for generating data packets according to a transport protocol from an application buffer comprising a plurality of data streams.

By segmenting the data packets based on the information contained in the metadata, a hardware-accelerated segmentation is enabled. Examples provide a joint hardware-software approach for segmenting data streams into data packets. The apparatus and method of FIGS. 1a and 1b relate to the hardware component of the approach, while the apparatus and method of FIGS. 2a and 2b relate to the software component. Accordingly, the apparatus 10 and method of FIGS. 1a and 1b may be denoted the "hardware apparatus" and "hardware-implemented method", and the apparatus 20 and method of FIGS. 2a and 2b may be denoted the "software apparatus" and "software-implemented method" (the term software apparatus being used for hardware that is configured by software to execute the features of the software apparatus, as are the terms "parsing circuit" and "input circuit" of the software apparatus). In some examples, both the apparatuses and the method of both components may also be implemented in software, e.g. as software for operating a microcontroller. For example, the software apparatus/software-implemented method may be implemented as a Generic Segmentation Offload layer in a kernel of the computer system or as a driver for the computer system.

In the present disclosure, the plural is often used, e.g. in relation to "data packets", "segmentation points", "segments", "stream segments" etc. This does not exclude situations, in which only a single data packet is to be generated, only a single possible segmentation point is identified, a single segment is to be transmitted or a single stream segment is present in a data stream etc. Consequently, where the plural is used, the plural may be interpreted as "one or more" (except if the plural is explicitly defined, as in "a plurality of", "two or more", "multiple").

In examples, an application buffer is filled by one or more applications with a plurality of data streams. In the present disclosure, the term "data stream" relates to any kind of payload data, e.g. any kind of payload data comprising one or more stream segments. In other words, a data stream may correspond to payload data that is divisible into segments, i.e. each data stream may comprise one or more stream segments. In other words, data streams of the plurality of data streams may (each) comprise one or more stream segments. Data streams may designate payload data that support multi-segment data transmission that may be spread over multiple data packets, i.e. a data stream may be spread over multiple data packets based on the segments it contains. A data stream may be capable of comprising a plurality of stream segments. A data stream may comprise a data stream header (or a data stream header and zero or more replicated data stream headers if the data stream is spread over multiple data packets) and a payload (e.g. comprising or corresponding to the one or more stream segments).

Figure 3:
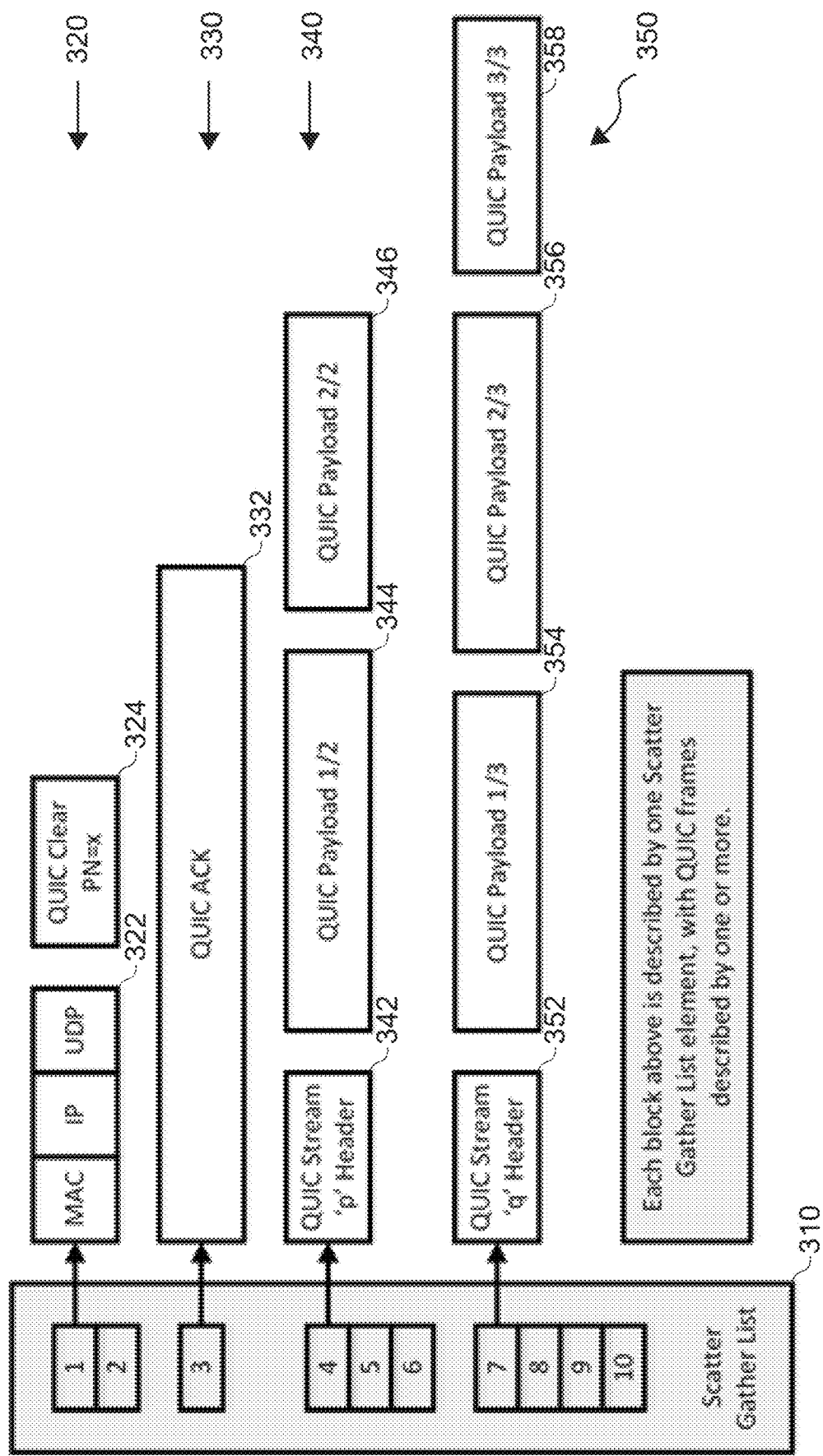
FIG. 3 illustrates an example of a scatter-gather list provided by an application.

Examples are not limited to a single type of data streams, such as QUIC data streams, but may be used by any kind of payload data. Accordingly, the transport protocol may be a (any) transport protocol that supports a transmission of payload data comprising one or more stream segments. For example, the transport protocol may be the Quick User Datagram Protocol Internet Connections, QUIC, protocol. The plurality of data streams are contained in the application buffer. In examples, the application is any kind of buffer or memory structure suitable for storing the plurality of data streams. For example, the application buffer may be a contiguous or non-contiguous memory region comprising a data structure for storing the plurality of data streams. For example, the data structure may be a so-called scatter-gather list, i.e. a linked list data structure that is suitable for storing the plurality of data streams. In other words, the application buffer may be a scatter-gather list or may be based on a scatter-gather list. Linked lists can be easily accessed in hardware and software. FIG. 3 shows an example of an application buffer that is based on a scatter-data list.

In addition to the application buffer, which may be provided by a stack of the transport protocol, metadata is received (e.g. accessed within a memory of the computer system 100 via the input circuit). For example, the metadata may comprise information about data packet types supported by the transport protocol. For example, the transport protocol may support different packet types, such as control packets and payload packets, ACK (Acknowledgement), Stream, Congestion Windows update, ping etc. The metadata may comprise information about an offset and a length of the supported data packet types. For example, the information about an offset and a length of the supported data packet types may define one of a fixed length, a minimal length and a maximal length of the supported packet types, and/or corresponding offsets. For example, the offsets may be based on the lengths of the packet types. For example, the offset between two (stream) segments may define a start of a (stream) segment relative to a fixed point, e.g. a start of a packet or a start of a stream header. For example, the first stream segment of a packet may have an offset of 0+length of the stream header, while the second stream segment of the packet may have an offset of 0+the length of the stream header+the length of the first stream segment. The metadata may further comprise information about possible stream header start positions (e.g. for each data stream), possible payload start positions (e.g. for each stream or for each segment of a stream) and possible (header or payload) offsets in the data streams (e.g. for each data stream, segment of a stream or stream header). For example, the metadata may comprise information about the maximum segment size (MSS).

The parsing circuit is configured to identify offsets in the application buffer as possible segmentation points based on the metadata. In some examples, the parsing circuit may be configured to parse the metadata to identify the offsets in the application buffer, e.g. if the metadata comprises the possible offsets in the data streams. The metadata may comprise information on a payload start (i.e. the start of the stream segments) and offset for each stream segment (from the payload start). The parsing circuit may be configured to identify (i.e. determine) the offsets in the application buffer using the metadata alone (e.g. without parsing the application buffer). In this case, the possible offsets may have been added to the metadata by the software apparatus or the software-implemented method. By obtaining the information on the payload start and offset from the metadata, the parsing circuit may be implemented at a lower complexity.

Alternatively, the parsing circuit is configured to parse the application buffer to determine information on a payload start and offset for each stream segment. For example, if the application buffer is based on a scatter-gather list, the parsing circuitry may be configured to traverse the scatter-gather list, identify the payload start and offset for each data stream and stream segment, and determine the information on a payload start and offset for each stream segment based on the identified payload start and offset. By parsing the application buffer in hardware, a further acceleration of the segmentation may be enabled, albeit at an increased hardware complexity. The parsing circuit may be configured to identify the offsets based on the information on the payload start and offset.

In some examples, each offset may be a possible segmentation point, i.e. the determination which segmentation point is to be used is performed in the segmentation. Alternatively, the parsing circuit may be configured to only identify an offset in the application buffer as possible segmentation point if a size of a segment defined by the offset is at maximum a maximum segment size, i.e. the possible segmentation points are identified based on the maximum segment size.

The parsing circuit is configured to segment the application buffer at the possible segmentation points into segments (which do not correspond to the stream segments) for data packets. For example, the parsing circuit may be configured to segment the application buffer into segments by including as many stream segments, headers etc. as possible into a segment, e.g. until the maximum segment size is reached. The parsing circuit may be configured to select a possible segmentation point for segmenting the application buffer into segments if a (directly) subsequent segmentation point exceeds the maximum segment size.

The parsing circuit is further configured to generate the data packets according to the transport protocol based on the segments. In general, each data packet may comprise the content of a (single) segment. In addition, each data packet may require one or more headers of the transport protocol (or transport protocols). For example, the transport protocol may have one or more levels that are nested (encapsulated). For example, for QUIC, the transport protocol may be QUIC over UDP over IP. The parsing circuit may be configured to generate the data packets by assembling the headers of the transport protocol(s) and the content of the segments.

In examples, multiple levels of headers may be distinguished. For example, the transport protocol may be based on two or more levels of headers. The two or more levels of headers may comprise at least one level of stream headers and at least one level of transport protocol headers. For example, the at least one level of transport protocol headers may comprise one or more of a level of headers for MAC, a level of headers for IP, a level of headers for UDP and a level of headers for QUIC (or whatever transport protocol is used). The levels of headers may be hierarchical. While the transport protocol headers may relate to the entire data packets, the stream headers may relate to the individual data streams comprised in the data packets. For example, a data packet may include (parts of) multiple data streams, with each data stream comprising a data stream-specific stream header. In other words, a stream header relates to at least a part of a data stream, e.g. contains control information on at least a part of the data stream. For example, the stream header may comprise information about at least one of a length of the data stream or part of the data stream contained in the same data packet, an offset of individual stream segments, and a checksum of the data stream, part of the data stream contained in the same data packet, or stream segment of the data stream.

One of the difficulties in the segmentation of the application buffer into the segments is the occurrence of situations in which a data stream does not fit into a single segment or in which a data stream is spread over multiple segments to improve an efficiency of the segmentation. In this case, each data packet comprising a segment of the data stream may comprise a stream header of the data stream. In general, the stream header of the data stream might be (originally) only present once in the application buffer, e.g. one stream header that relates to all of the stream segments of the data stream. Accordingly, for this to work, the stream header of the data stream may be replicated so it can be included in each packet comprising a segment of the data stream.

For example, if the parsing circuit identifies a possible segmentation point between a first portion of a payload of one of the plurality of data streams and a second portion of the payload of one of the plurality of data streams (the first and second portion each comprising at least one stream segment of the data stream), the parsing circuit may be configured to generate a first data packet comprising the first portion of the payload and the stream header of the one of the plurality of data streams, and to generate a second data packet comprising the second portion of the payload and a replication of the stream header of the one of the plurality of data streams. When spreading a data stream over two packets, a replicated header may be required in the second packet. In other words, the parsing circuit may be configured to include a stream header for each data packet comprising a segment of a data stream. If a data stream is spread over a first and a second data packet, a replicated stream header may be included in the second data packet (and the "original" stream header). For example, the parsing circuit may be configured to include the replicated stream header in the second data packet based on the information on the start and the offset of the respective stream header. By obtaining the information on a start and an offset from the metadata, the parsing circuit may be implemented at a lower complexity. For example, the application buffer may comprise a plurality of stream headers for the plurality of data streams. At least a subset of the plurality of stream headers may be replicated and used in the generation of the data packets. The data packets may be generated using the replicated stream headers.

To be able to include a replicated header in the second packet, it may be generated, either by the software apparatus/software-implemented method or by the hardware apparatus/hardware-implemented method.

For example, the replicated headers (of at least one of the levels of headers) may be generated by the software apparatus/software-implemented method. For example, the application buffer may comprise the replicated stream headers. The replicated stream headers may be inserted in the application buffer after at least a subset of the possible segmentation points. For example, the replicated stream headers may be inserted based on the maximum segment size, e.g. at a possible segmentation point close to the maximum segment size. The maximum segment size may determine a maximum distance between segmentation points. In this case, the replicated stream headers may originate from a software application (e.g. the software apparatus/software-implemented method) of the computer system 100 comprising the apparatus. By generating the replicated stream headers in software, a complexity of the parsing circuit may be reduced.

Alternatively (or additionally, in case stream headers of different levels of headers are generated differently), the replicated headers (of at least one of the levels of headers) may be generated by the hardware apparatus/hardware-implemented method. In other words, the parsing circuit may be configured to generate the replicated stream headers based on the plurality of stream headers. This may enable a further acceleration of the segmentation, albeit at an increased hardware complexity.

In order to generate the replication of the stream header, the stream header may be adjusted to the length and offset of the stream segments that are accompanied by the stream header. For example, if a data stream comprises four stream segments, which are segmented into two packets, the first two stream segments may be accompanied by the "original" stream header (of the plurality of stream headers), and the subsequent two stream segments may be accompanied by the replicated stream header. As the "original" stream headers originally relates to the four stream segments, it may be adjusted, so that a length and list of offsets included in the stream header matches the first two stream segments. Likewise the replicated stream header: The replicated stream header may be adjusted so that a length and list of offsets included in the replicated stream header matches the subsequent two stream segments. In other words, the parsing circuit may be further configured to update information about a length of the payload in the stream header and the replication of the stream header. The parsing circuit may be configured to update at least one of information about a length of the payload, information about an offset of the payload and information about a checksum of the payload in the stream header and the replicated stream header. When a data stream is spread over multiple packets, the stream headers may be adjusted accordingly.

Headers of different levels of headers may be treated differently. For example, some header levels may require header replication. In some header levels the replicated headers may be generated in software, in some header levels the header replication may be generated in hardware etc. In some examples, the transport protocol headers may be replicated by the hardware apparatus or hardware-implemented method, and the stream headers may be replicated by the software apparatus or the software-implemented method. Alternatively, both the transport protocol headers and the stream headers may be replicated by the hardware apparatus or hardware-implemented method. To support various scenarios, the software apparatus/software-implemented method may add an indication on weather a stream header (of a specific header level or a specific stream header) to be replicated to the metadata. In other words, the metadata may comprise an indication on whether the stream header is to be replicated by the apparatus, e.g. for each stream header of the plurality of stream headers. The parsing circuit may be configured to generate the replicated stream header for a stream header if the metadata indicates that the stream header is to be replicated by the apparatus. The indication may instruct the parsing circuit to generate the replicated stream headers.

In some cases, the software apparatus/software-implemented method may generate the replicated headers and include them in the application buffer but fail to add corresponding metadata about the replicated headers. In these cases, the hardware apparatus/hardware-implemented method may detect the replicated stream headers in the application buffer. In other words, the parsing circuit may be configured to parse the application buffer to determine information on a start and an offset for each replicated stream header. The parsing circuit may be configured to generate the data packets based on the information on the start and the offset of the replicated stream headers. The start and the offset of the replicated stream header may be used in generating the data packets. By parsing the application buffer in hardware, a further acceleration of the segmentation may be enabled, albeit at an increased hardware complexity.

Figure 4A:
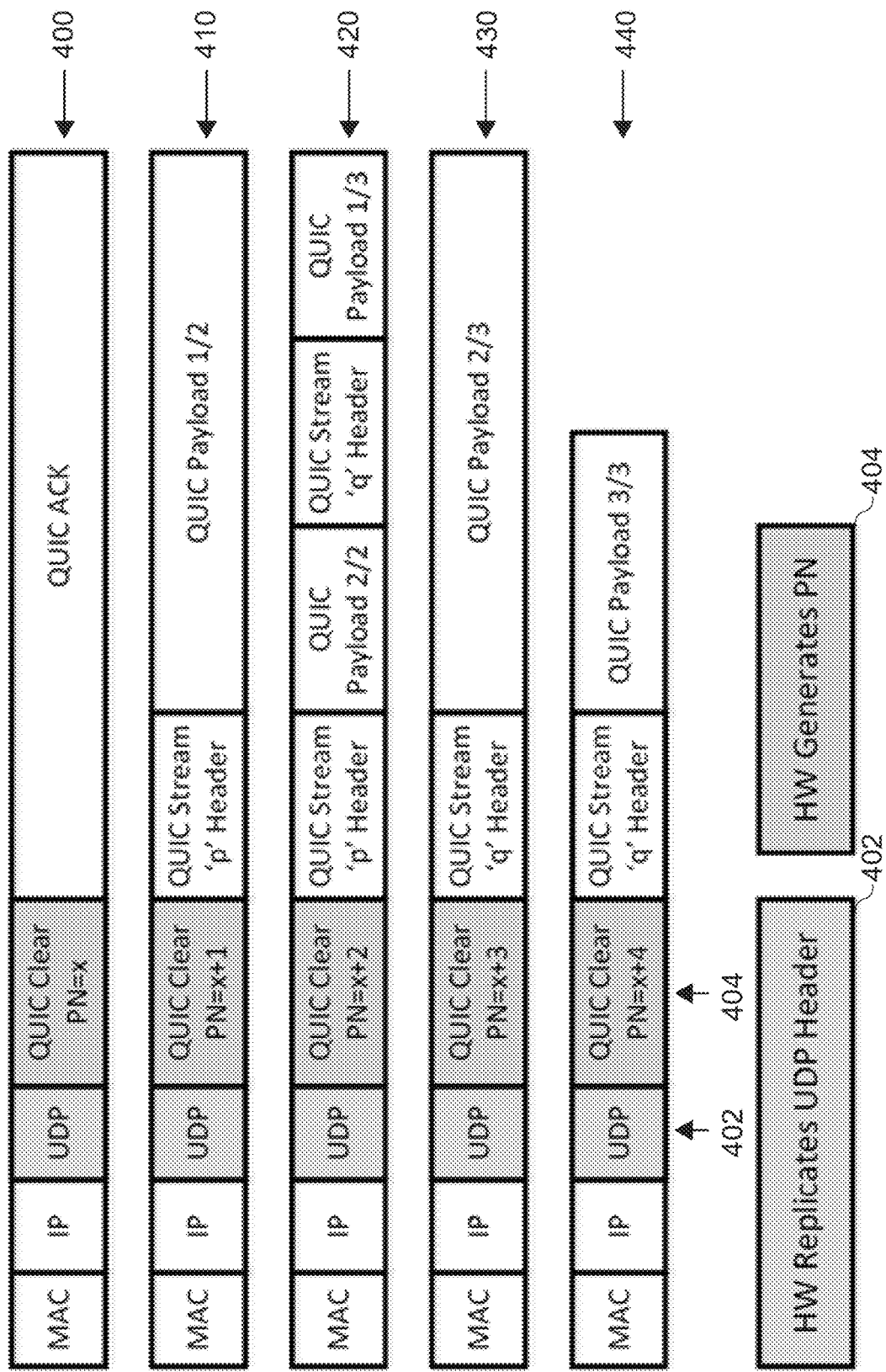
FIG. 4a illustrates an example of a segmentation by hardware and software layers.

In addition to the stream headers, one or more headers of the transport protocol may be included in each data packet. For example, the application buffer may further comprise a transport protocol header (e.g. one or more transport protocol headers, to be used for the data packets). The parsing circuit may be configured to generate the data packets to comprise the (one or more) transport protocol header(s) (e.g. as shown in FIGS. 4a and/or 1b). The transport protocol header(s) may be added by the (hardware) apparatus. For example, the transport protocol header (or headers) may comprise at least one of Media Access Control (MAC) information, Internet Protocol (IP) information, User Datagram Protocol (UDP) information, Transmission Control Protocol information and information about a packet number.

For example, in QUIC, the information about the packet number may be in the QUIC header (which is also a transport protocol header), and the MAC, UDP and IP information may be in the transport protocol headers of the underlying transport protocols. This packet number may be generated by the parsing circuitry, e.g. based on a start packet number comprised in the application buffer. For example, the application buffer may comprise a start packet number to be used for the data packets, and the parsing circuit may be configured to generate the data packets with packet numbers starting from the start packet number. For example, if the transport protocol is QUIC, the data packets may be QUIC packets and the packet number may be in the QUIC header. The packet numbers may be generated by the (hardware) apparatus. Coming back to the example set out above, the parsing circuit may be further configured to generate the first data packet and the second data packet to comprise information about a respective packet number.

Additionally, the data packets may comprise a checksum for payload in the respective data packet. In some cases, the checksum may be calculated for the entire data packet, e.g. as UDP checksum, to be included in the transport protocol header(s). Alternatively, the checksum (or checksums) may be included in the stream headers. The parsing circuit may be further configured to generate the data packets to comprise information about a checksum for payload in the respective data packet. The checksum may either be supplied by the application, by the software apparatus/software-implemented method (and be comprised in the application buffer) or by the hardware apparatus/hardware-implemented method. For example, the parsing circuit may be configured to generate the checksum. By generating the checksum in hardware, the segmentation may be accelerated.

Some packet types may require padding. When padding is used, a data packet is extended to match a pre-defined length, e.g. by adding dummy data at the end of the data packet. Padding does not apply to all packet types, i.e. it may be optional for some padding types, but not for others. The parsing circuit may be further configured to pad the segments if the metadata comprises information that segments of the application buffer that are smaller in size than a maximum segment size are to be padded. Padding may be required by some packet types. While stream frames may be split and their headers replicated, protocol control management elements may not be split, so packets must either end or be padded if the next management element is larger than the remaining MSS for that packet. For example, the application buffer may further comprise transport protocol management data elements. If a segment comprises a transport protocol management data element smaller than the maximum segment size, the parsing circuit may be configured to pad the transport protocol management data element (to generate the data packet as padded data packet, with the dummy data added after the transport protocol management data element) or to end the data packet after the transport protocol management data element.

The input circuit 12 may correspond to an interface for receiving information, which may be in digital (bit) values according to a specified code, within a module, between modules or between modules of different entities. For example, the input circuit 12 may comprise. The parsing circuit 14 may be implemented using application-specific hardware, e.g. using an Application-Specific Integrated Circuit. For example, the parsing circuit 14 may be implemented by a networking circuit, e.g. wireless or wire-bound networking circuit. Alternatively or additionally, the parsing circuit may be implemented using one or more processing units, one or more processing devices, any means for processing, such as a processor, a computer or a programmable hardware component being operable with accordingly adapted software. In other words, the described function of the parsing circuit 14 may as well be implemented in software, which is then executed on one or more programmable hardware components. Such hardware components may comprise a general purpose processor, a Digital Signal Processor (DSP), a micro-controller, etc.

Figure 2A:
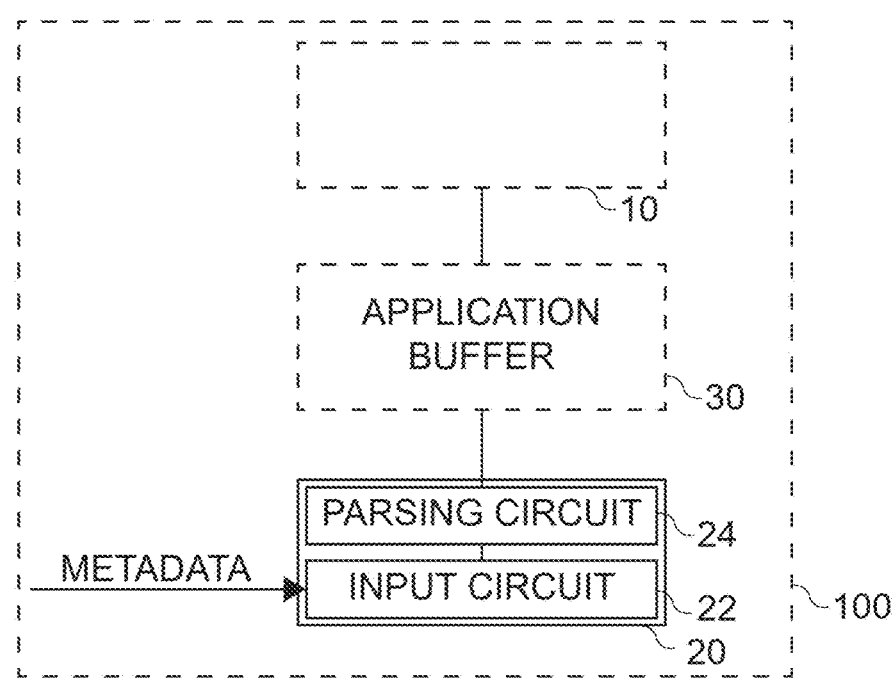
FIG. 2a illustrates a block diagram of an example of an apparatus for processing an application buffer.

FIG. 2a illustrates a block diagram of an example of an apparatus 20 ("software apparatus") for processing an application buffer 30 comprising a plurality of data streams. The apparatus comprises an input circuit 22 configured to obtain metadata comprising at least one of information about data packet types supported by the transport protocol, information about an offset and a length of the supported data packet types, and information about possible stream header start positions, possible payload start positions and possible offsets in the data streams. The apparatus comprises a parsing circuit 24 that is coupled to the input circuit 22. Furthermore, the parsing circuit may be coupled to the application buffer, i.e. the parsing circuit may have access to the application buffer. The parsing circuit is configured to identify offsets in the application buffer as possible segmentation points based on the metadata. The parsing circuit is configured to identify the stream headers of the plurality of data streams. The parsing circuit is configured to insert replicated stream headers into the application buffer after the possible segmentation points based on the identified stream headers and/or add an indication on whether the stream headers are to be replicated by an apparatus for generating data packets to the metadata. FIG. 2a further shows a computer system comprising the apparatus 20 (and the application buffer 30 and the hardware apparatus 10).

Figure 2B:
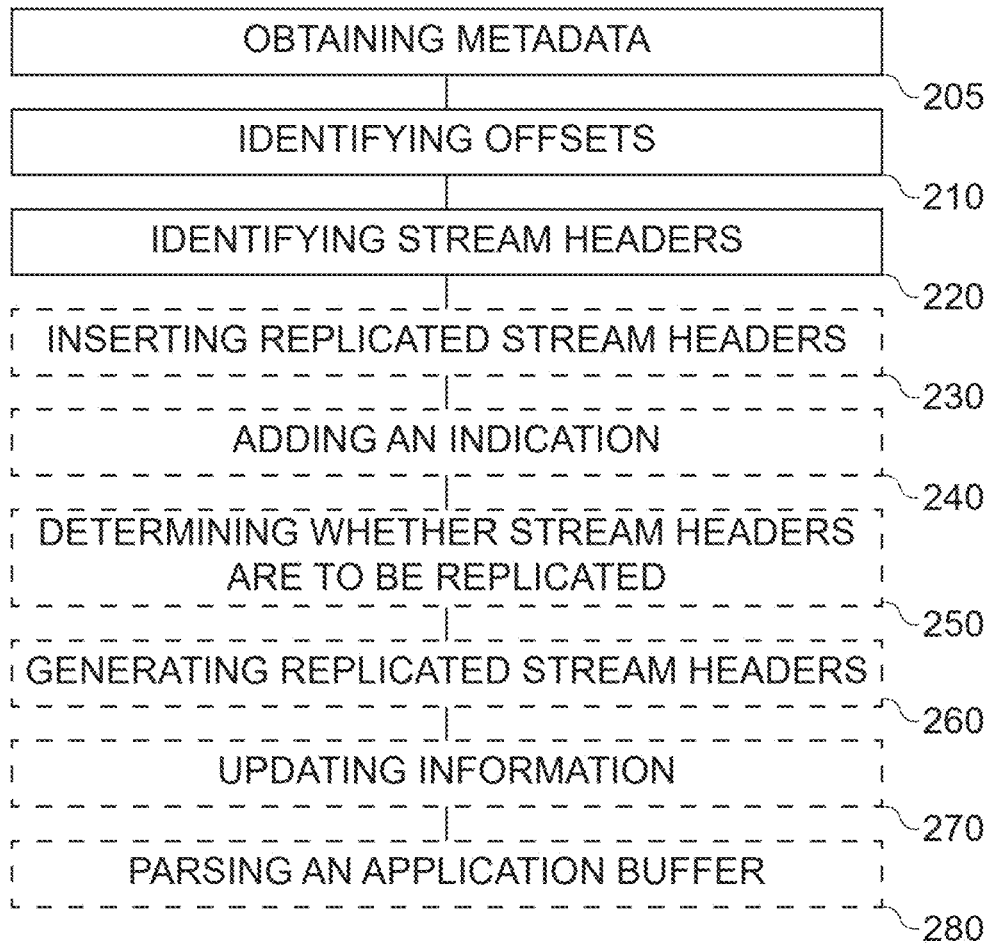
FIG. 2b illustrates a flow chart of an example of a method for processing an application buffer.

FIG. 2b illustrates a flow chart of an example of a corresponding method ("software-implemented method") for processing an application buffer comprising a plurality of data streams. The method comprises obtaining 205 (e.g. receiving) metadata comprising at least one of information about data packet types supported by the transport protocol, information about an offset and a length of the supported data packet types, and information about possible stream header start positions, possible payload start positions and possible offsets in the data streams. The method comprises identifying 210 offsets in the application buffer as possible segmentation points based on the metadata. The method comprises identifying 220 the stream headers of the plurality of data streams. The method comprises inserting 230 replicated stream headers into the application buffer after the possible segmentation points based on the identified stream headers and/or adding 240 an indication on whether the stream headers are to be replicated by an apparatus for generating data packets to the metadata. For example, the method may be executed by the apparatus 20.

The following description relates to both the apparatus of FIG. 2a and the method of FIG. 2b. Features of the apparatus, such as capabilities of the parsing circuit, may also constitute features of the corresponding method.

Examples of FIGS. 2a and/or 2b relate to an apparatus and method for processing the application buffer 30 comprising the plurality of data streams, e.g. to augment the content of the application buffer and of the metadata to enable the hardware apparatus/hardware-implemented method to perform the segmentation. Both the apparatus 10/method of FIGS. 1a/1b and the apparatus 20/method of FIGS. 2a/2b may share the metadata and the application buffer. For example, the metadata and the application buffer may be stored in a memory of the computer system 100 that is accessible for both the apparatus 10/method of FIGS. 1a/1b and the apparatus 20/method of FIGS. 2a/2b. Consequently, the data, features and objects that are shared among the apparatuses/method or that can be implemented either in software or in hardware may be implemented similarly by the apparatus 20/method of FIGS. 2a/2b (software apparatus/software-implemented method and the apparatus 10/method of FIGS. 1a/1b (hardware apparatus/hardware-implemented method).

The parsing circuit is configured to identify offsets in the application buffer as possible segmentation points based on the metadata, e.g. by parsing/traversing the application buffer based on at least one of the information about data packet types supported by the transport protocol, the information about the offset and the length of the supported data packet types, and the information about possible stream header start positions, possible payload start positions and possible offsets in the data streams.

The parsing circuit is configured to identify the stream headers of the plurality of data streams, e.g. by parsing/traversing the application buffer and identifying the stream headers among the parsed/traversed headers of the application buffer.

With the identified stream headers, the parsing circuit may be configured to:
  a) identify stream headers that are to be replicated (based on the possible segmentation points and/or based on the maximum segment size)
  b) identify which (if any) stream headers are to be replicated by the software apparatus/software-implemented method, and
  c) optionally, identify which (if any) stream headers are to be replicated by the hardware apparatus/hardware-implemented method.

Accordingly, the parsing circuit may be configured to determine, for the identified stream headers, whether the stream headers are to be replicated by the apparatus/method for generating data packets (hardware) or by the apparatus/method for processing the application buffer (software).

In case at least some of the stream headers are to be replicated by the software apparatus/software-implemented method, the respective stream headers may be replicated by the parsing circuit and inserted into the application buffer after the possible segmentation points based on the identified stream headers. The parsing circuit may be configured to generate the replicated stream headers based on the identified stream headers. As already introduced in connection with FIGS. 1a and/or 1b, the stream headers may be adjusted based on the possible segmentation points. For example, the parsing circuit may be configured to update at least one of information about a length of the payload, information about an offset of the payload and information about a checksum of the payload in the stream header and the replicated stream header (e.g. based on the possible segmentation points).

In case at least some of the stream headers are to be replicated by the hardware apparatus/hardware-implemented method, the hardware apparatus/hardware-implemented method may be instructed to replicate the respective stream headers. In other words, the parsing circuit may be configured to add the indication on whether the stream headers are to be replicated by an apparatus for generating data packets according to the metadata accordingly.

In addition, the software apparatus/software-implemented method may augment the metadata, e.g. by determining some of the metadata for the hardware apparatus/hardware-implemented method. For example, the parsing circuit may be configured to parse the application buffer to determine information on a start and an offset for each replicated stream header (e.g. as described in connection with FIGS. 1a/1b. The parsing circuit may be configured to add the information on the start and the offset to the metadata. Additionally or alternatively, the parsing circuit may be configured to parse the application buffer to determine information on a payload start and offset for each stream segment. The parsing circuit may be configured to add information on the payload start and offset to the metadata.

The input circuit 22 may correspond to an interface for receiving information, which may be in digital (bit) values according to a specified code, within a module, between modules or between modules of different entities. The parsing circuit 24 may be implemented using application-specific hardware, e.g. using an Application-Specific Integrated Circuit. For example, the parsing circuit 14 may be implemented by a networking circuit, e.g. wireless or wirebound networking circuit. Alternatively or additionally, the parsing circuit may be implemented using one or more processing units, one or more processing devices, any means for processing, such as a processor, a computer or a programmable hardware component being operable with accordingly adapted software. In other words, the described function of the parsing circuit 14 may as well be implemented in software, which is then executed on one or more programmable hardware components. Such hardware components may comprise a general purpose processor, a Digital Signal Processor (DSP), a micro-controller, etc.

More details and aspects of the software apparatus 20 and/or software-implemented method are mentioned in connection with the proposed concept or one or more examples described above (e.g. FIG. 1a to 1b). The software apparatus 20 and/or software-implemented method may comprise one or more additional optional features corresponding to one or more aspects of the proposed concept or one or more examples described above or below.

In the following, a method of implementing segmentation of a QUIC application buffer is presented as an exemplary implementation of the concepts laid out in connection with FIGS. 1a to 2b. While the example is presented in connection with the QUIC transport protocol, the features and concepts presented below may be combined with any feature or example that is presented above or below, e.g. in a generalized manner.

Previous solutions for segmentation of QUIC buffers are purely software-based. The segmentation is done in the protocol in user mode. The complexity in the software stack results in a CPU (Central Processing Unit) intensive implementation. From previous experience with TCP (Transmission Control Protocol) and UDP (User Datagram Protocol) segmentation, we know that this is ~4× x more expensive than an offload. Hence, there may be a desire for a technique that accelerates segmentation of QUIC buffers. At least some examples relate to segmentation of transport protocol, e.g. Quick User Datagram Protocol Internet Connections, QUIC, protocol, application buffers.

Some examples of the present disclosure provide a hardware offload that accelerates segmentation of QUIC buffers. The hardware does segmentation for UDP and TCP packets. Since QUIC runs on a UDP transport, UDP offload is not satisfactory so the offload may be extended to do QUIC segmentation. Segmentation in protocol stack may be the most expensive way to segment packets. Moving it down the stack to a software implementation in driver saves 50% of the cycles or so. Going further into an offload is expected to save the cycles of the entire operation and improve performance by 4×.

As illustrated in FIG. 3, the QUIC stack accepts data from multiple higher level application. FIG. 3 illustrates an example of a scatter-gather list 310 provided by an application. The scatter gather list comprises linked list-addresses 1 through 10 which link to the respective headers and payloads 322 through 358. For example, row 320, which is linked to addresses 1 and 2 comprises the transport protocol headers 322 (MAC, IP, UDP) and 324 (QUIC Clear Packet Number). Row 330, which is linked to address 3, comprises a QUIC Acknowledgement 332. Row 340, which is linked to addresses 4-6, comprises QUIC Stream 'p' Header 342, QUIC Payload 1/2 344 (of data stream 'p') and QUIC Payload 2/2 346 (of data stream 'p'). Row 350, which is linked to addresses 7-10, comprises QUIC Stream 'q' Header 352, QUIC Payload 1/3 354 (of data stream 'q'), QUIC Payload 2/3 356 (of data stream 'q') and QUIC Payload 3/3 358 (of data stream 'q'). Each block is described by one Scatter Gather List element, with QUIC frames describe by one or more.

There is a 'stream' of data from each higher level application. The QUIC stack selects a chunk of data from each stream to be sent in the next QUIC packet. This piece of data is called a frame and the QUIC stack inserts a frame header into the QUIC packet to identify the application/stream to which it belongs. It may also choose to piggyback control packets like ACK or window size update with the data buffer. The protocol stack operations result in a scatter-gather list of headers and payloads provided to the transmit interface.

The standard defines that every QUIC packet has a QUIC header and that every frame within the QUIC packet begins with a frame header. The QUIC stack tracks what data was sent for every QUIC packet number. This is for ACKs/retries.

The QUIC Application buffers can arrive with a single stream construct like:

*MAC – IP – UDP – QUIC* Clear(*PN* = *x*) –

-continued

QUIC Stream Header – QUIC Payload.

Alternately they could arrive with several QUIC Constructs interleaved as:

$$MAC - IP - UDP - QUIC\ \text{Clear}(PN = x) - QUIC\ ACK -$$
$$QUIC\ \text{Stream `}p\text{' Header} - QUIC\ \text{Stream `}p\text{' Payload} -$$
$$QUIC\ \text{Stream `}q\text{' Header} - QUIC\ \text{Stream `}q\text{' Payload}.$$

The list of these headers and payloads may be made of multiple buffer segments. The QUIC transmit can have significant variation in the constructs that constitute the buffer. There are two main categories of constructs that can arrive in the application buffer:
  a) Stream constructs (e.g. data streams). These are made up of a stream header and stream payload.
  b) Protocol management constructs like ACK, key negotiation, connection Id negotiation, etc. Protocol management constructs cannot cross a boundary.

Figure 4B:
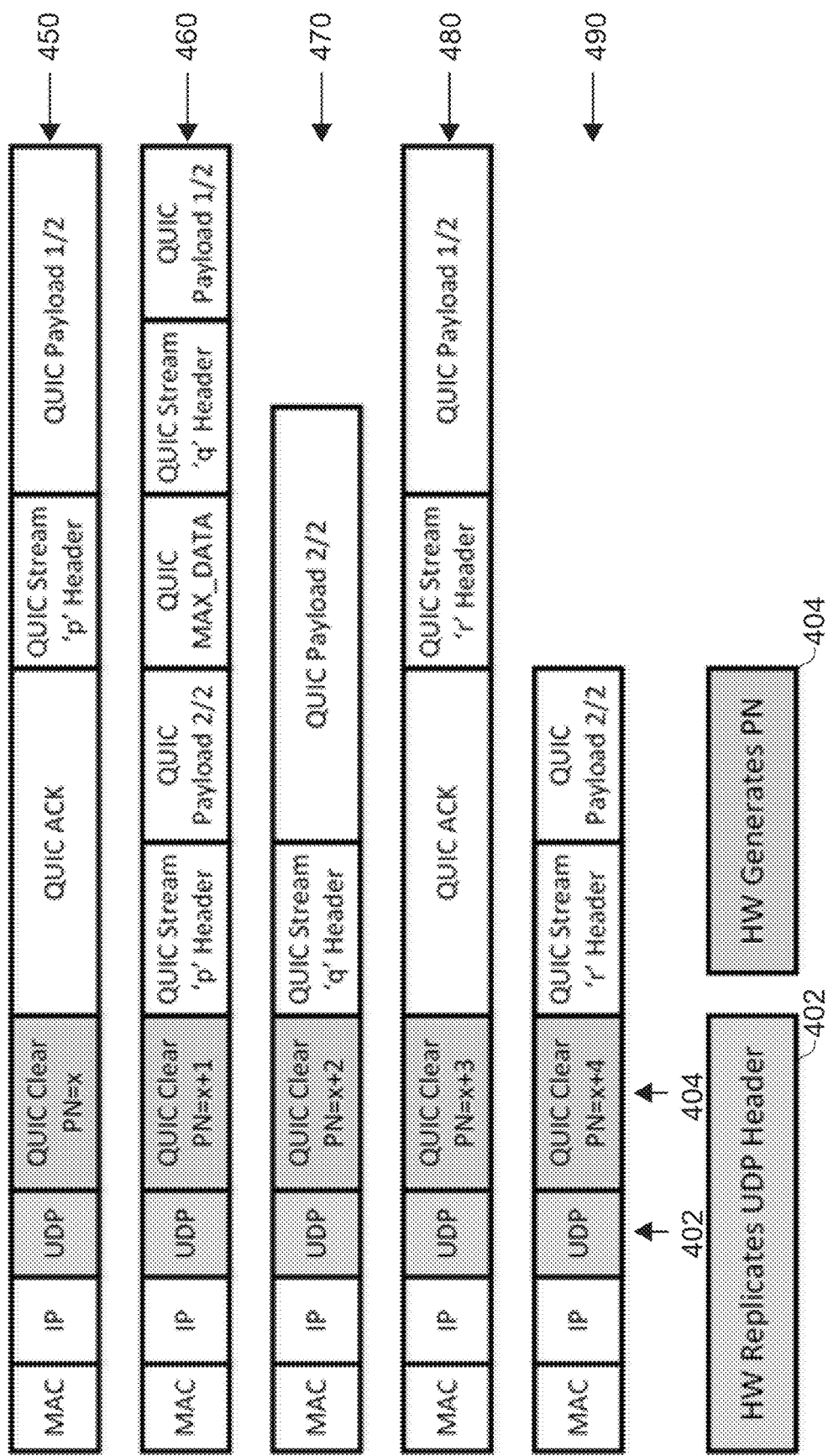
FIG. 4b illustrates another example of a segmentation by hardware and software layers.

FIGS. 4a and 4b illustrate examples of a segmentation provided by hardware and software layers. As illustrated in FIG. 4a, the extended hardware changes may segment the buffer as follows:

$$MAC - IP - UDP - QUIC\ \text{Clear}\ (PN = x) - QUIC\ ACK \quad (400)$$

$$MAC - IP - UDP - QUIC\ \text{Clear}\ (PN = x + 1) - \quad (410)$$
$$QUIC\ \text{Stream `}p\text{' Header} - QUIC\ \text{Payload}\ 1/2$$

$$MAC - IP - UDP - QUIC\ \text{Clear}\ (PN = x + 2) - \quad (420)$$
$$QUIC\ \text{Stream `}p\text{' Header} - QUIC\ \text{Payload}\ 2/2 -$$
$$QUIC\ \text{Stream `}q\text{' Header} - QUIC\ \text{Payload}\ 1/3$$

$$MAC - IP - UDP - QUIC\ \text{Clear}\ (PN = x + 3) - \quad (430)$$
$$QUIC\ \text{Stream `}q\text{' Header} - QUIC\ \text{Payload}\ 2/3$$

$$MAC - IP - UDP - QUIC\ \text{Clear}\ (PN = x + 4) - \quad (440)$$
$$QUIC\ \text{Stream `}q\text{' Header} - QUIC\ \text{Payload}\ 3/3$$

The hardware replicates UDP Header 402 and generates packet number 404 (with x being the start packet number).

An alternative segmentation according to the proposed technique is illustrated in FIG. 4b.

$$MAC - IP - UDP - QUIC\ \text{Clear}\ (PN = x) - QUIC\ ACK - \quad (450)$$
$$QUIC\ \text{Stream `}p\text{' Header} - QUIC\ \text{Payload}\ 1/2$$

$$MAC - IP - UDP - QUIC\ \text{Clear}\ (PN = x + 1) - \quad (460)$$
$$QUIC\ \text{Stream `}p\text{' Header} -$$
$$QUIC\ \text{Payload}\ 2/2 - QUIC\ \text{MAX\_DATA} -$$
$$QUIC\ \text{Stream `}q\text{' Header} - QUIC\ \text{Payload}\ 1/2$$

$$MAC - IP - UDP - QUIC\ \text{Clear}\ (PN = x + 2) - \quad (470)$$
$$QUIC\ \text{Stream `}q\text{' Header} - QUIC\ \text{Payload}\ 2/2$$

$$MAC - IP - UDP - QUIC\ \text{Clear}\ (PN = x + 3) - QUIC\ ACK - \quad (480)$$
$$QUIC\ \text{Stream `}r\text{' Header} - QUIC\ \text{Payload}\ 1/2$$

$$MAC - IP - UDP - QUIC\ \text{Clear}\ (PN = x + 4) - \quad (490)$$
$$QUIC\ \text{Stream `}r\text{' Header} - QUIC\ \text{Payload}\ 2/2$$

The extensions that enable this outcome may be:
The segmentation algorithm is complex so it is broken down into two parts:
  a) Protocol specific modification in software to identify hints for hardware segmentation.
  b) Simple and generic hardware implementation. This allows the algorithm to scale to other UDP based transports like RTP (Real-Time Transport Protocol).

For the QUIC aware segmentation offload, the information provided to server has the following characteristics:
  a) The QUIC stack may generate a large buffer (e.g. the application buffer) and associated metadata. The large buffer may be in the form of an iovec (a data structure) scatter-gather list.
  b) The large buffer may begin with a QUIC header. The PN in this header may be the starting PN. The remainder of the buffer contains a sequence of frames. Each frame begins with a frame header.
  c) The metadata contains the MSS and a set of offsets for every packet type. The meta data list is:
    a. Packet type—ACK, Stream, Congestion Windows update, ping, etc.
    b. Offset and length of each packet type.
    c. Padding bit to identify if the packet should be padded, were it less than MSS.
    d. Stream header and payload start and offset for each stream.
  d) The stack may or may not provide this information by default. If it were missing, the stack would need to be augmented to be segmentation aware.

Software (e.g. the software apparatus/software-implemented method) may be augmented to look at the meta-data provided by the stack and further calculate the following:
  a) Each offset indicates a segmentation point.
  b) The distance between each segmentation point may fit within the MSS.
  c) A segmentation point may or may not need a header replication. If a header replication is needed, the header may be replicated and inserted between the segmentation points in link list elements.
  d) The metadata associated with each segment point may provide the following:
    a. Packet type—ACK, Stream, Congestion Windows update, ping, etc.
    b. Offset and length of each packet type.
    c. Padding bit to identify if the packet should be padded, were it less than MSS.
    d. For each stream, stream header start and offset for each replicated element.
    e. For each stream, stream payload start and offset for each stream segment.
    f. Encrypt bit set or cleared.
  e) The metadata processing function could be implemented in a GSO (Generic Segmentation Offload) layer in the kernel or in driver.
  f) The metadata processing function can change if the protocol changes. It can also be modified to include new fields to extend to other protocols like RTP.

The hardware (e.g. the hardware apparatus/hardware-implemented method) may be extended to do the following:
  a) In the hardware, the parser was extended to parse entire buffer and identify the meta-data tags provided by software layer.
  b) The segmentation function may:
    a. Split the large buffer at the segmentation points indicated by the offsets.

b. Stream header may be provided by the software layer, hardware may update the length in stream header. If pad bit is set, last segment may be padded.
c. Protocol control constructs do not have a header replicate. If the element does not fill an entire packet, it may be followed by a partial stream or padding—depending on the arrangement of entire segment.
d. Prepend a QUIC (including UDP etc.) header, replicate it for each packet and then update the packet number.

c) UDP checksums may be computed on the payload.

There is a chance that the header formats can change anytime. While the hardware/microcode changes catch up with this, the software may be augmented to partially segment a part of the request and partial set of rules.

In other words, examples relate to a method of implementing segmentation of QUIC application buffers. Although described above with respect to the QUIC protocol, the proposed segmentation technique may be used with any other transport protocol.

More details and aspects of the exemplary implementation are mentioned in connection with the proposed concept or one or more examples described above (e.g. FIG. 1a to 2b). Examples may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a like feature of the other example or in order to additionally introduce the feature to the other example.

Example 1 relates to an apparatus (10) for generating data packets according to a transport protocol from an application buffer (30) comprising a plurality of data streams, the apparatus comprising an input circuit (12) configured to receive metadata comprising at least one of information about data packet types supported by the transport protocol, information about an offset and a length of the supported data packet types, and information about possible stream header start positions, possible payload start positions and possible offsets in the data streams. The apparatus (10) comprises a parsing circuit (14) configured to identify offsets in the application buffer as possible segmentation points based on the metadata. The parsing circuit (14) is configured to segment the application buffer at the possible segmentation points into segments for data packets. The parsing circuit (14) is configured to generate data packets according to the transport protocol based on the segments.

In Example 2, the subject matter of example 1 or any of the Examples described herein may further include, that the application buffer comprises a plurality of stream headers for the plurality of data streams, wherein at least a subset of the plurality of stream headers are replicated and used in the generation of the data packets.

In Example 3, the subject matter of example 2 or any of the Examples described herein may further include, that the application buffer comprises the replicated stream headers, the replicated stream headers originating from a software application of a computer system comprising the apparatus.

In Example 4, the subject matter of example 2 or any of the Examples described herein may further include, that the parsing circuit is configured to generate the replicated stream headers based on the plurality of stream headers.

In Example 5, the subject matter of example 4 or any of the Examples described herein may further include, that for each stream header, the metadata comprises an indication on whether the stream header is to be replicated by the apparatus, wherein the parsing circuit is configured to generate the replicated stream header for a stream header if the metadata indicates that the stream header is to be replicated by the apparatus.

In Example 6, the subject matter of one of the examples 4 to 5 or any of the Examples described herein may further include, that the parsing circuit is configured to update at least one of information about a length of the payload, information about an offset of the payload and information about a checksum of the payload in the stream header and the replicated stream header.

In Example 7, the subject matter of one of the examples 2 to 6 or any of the Examples described herein may further include, that the parsing circuit is configured to parse the application buffer to determine information on a start and an offset for each replicated stream header, wherein the parsing circuit is configured to generate the data packets based on the information on the start and the offset of the replicated stream headers.

In Example 8, the subject matter of one of the examples 2 to 7 or any of the Examples described herein may further include, that the parsing circuit is configured to include a stream header for each data packet comprising a segment of a data stream, wherein, if a data stream is spread over a first and a second data packet, a replicated stream header is included in the second data packet.

In Example 9, the subject matter of example 8 or any of the Examples described herein may further include, that the metadata comprises information on a start and an offset for each replicated stream header, wherein the parsing circuit is configured to include the replicated stream header in the second data packet based on the information on the start and the offset of the respective stream header.

In Example 10, the subject matter of one of the examples 2 to 9 or any of the Examples described herein may further include, that the metadata further comprises information about a maximum segment size, wherein the replicated stream headers are inserted based on the maximum segment size.

In Example 11, the subject matter of one of the examples 1 to 10 or any of the Examples described herein may further include, that data streams of the plurality of data streams comprise one or more stream segments, wherein the parsing circuit is configured to parse the application buffer to determine information on a payload start and offset for each stream segment, wherein the parsing circuit is configured to identify the offsets based on the information on the payload start and offset.

In Example 12, the subject matter of one of the examples 1 to 11 or any of the Examples described herein may further include, that the transport protocol is based on two or more levels of headers, the two or more levels comprising at least one level of stream headers and at least one level of transport protocol headers.

In Example 13, the subject matter of one of the examples 1 to 12 or any of the Examples described herein may further include, that data streams of the plurality of data streams comprise one or more stream segments, wherein the metadata comprises information on a payload start and offset for each stream segment, wherein the parsing circuit is configured to identify the offsets based on the information on the payload start and offset.

In Example 14, the subject matter of one of the examples 1 to 13 or any of the Examples described herein may further include, that the application buffer comprises a start packet number to be used for the data packets, wherein the parsing circuit is configured to generate the data packets with packet numbers starting from the start packet number.

In Example 15, the subject matter of one of the examples 1 to 14 or any of the Examples described herein may further include, that the application buffer further comprises a transport protocol header, and wherein the parsing circuit is configured to generate the data packets to comprise the transport protocol header.

In Example 16, the subject matter of example 15 or any of the Examples described herein may further include, that the transport protocol header comprises at least one of Media Access Control information, Internet Protocol information, User Datagram Protocol information, Transmission Control Protocol information and information about a packet number.

In Example 17, the subject matter of one of the examples 1 to 16 or any of the Examples described herein may further include, that the parsing circuit is further configured to generate the data packets to comprise information about a checksum for payload in the respective data packet.

In Example 18, the subject matter of example 17 or any of the Examples described herein may further include, that the parsing circuit is configured to generate the checksum.

In Example 19, the subject matter of one of the examples 1 to 18 or any of the Examples described herein may further include, that if the parsing circuit identifies a possible segmentation point between a first portion of a payload of one of the plurality of data streams and a second portion of the payload of one of the plurality of data streams, the parsing circuit is configured to generate a first data packet comprising the first portion of the payload and the stream header of the one of the plurality of data streams. The parsing circuit may be configured to generate a second data packet comprising the second portion of the payload and a replication of the stream header of the one of the plurality of data streams.

In Example 20, the subject matter of example 19 or any of the Examples described herein may further include, that the parsing circuit is further configured to update information about a length of the payload in the stream header and the replication of the stream header.

In Example 21, the subject matter of one of the examples 19 to 20 or any of the Examples described herein may further include, that the parsing circuit is further configured to generate the first data packet and the second data packet to comprise information about a respective packet number.

In Example 22, the subject matter of one of the examples 1 to 21 or any of the Examples described herein may further include, that the metadata further comprises information about a maximum segment size, and wherein the parsing circuit is configured to only identify an offset in the application buffer as possible segmentation point if a size of a segment defined by the offset is at maximum the maximum segment size.

In Example 23, the subject matter of one of the examples 1 to 22 or any of the Examples described herein may further include, that the parsing circuit is further configured to pad the segments if the metadata comprises information that segments of the application buffer that are smaller in size than a maximum segment size are to be padded.

In Example 24, the subject matter of one of the examples 1 to 23 or any of the Examples described herein may further include, that the application buffer further comprises transport protocol management data elements, and wherein, if a segment comprises a transport protocol management data element smaller than a maximum segment size, the parsing circuit is configured to pad the transport protocol management data element or to end the data packet after the transport protocol management data element.

In Example 25, the subject matter of one of the examples 1 to 24 or any of the Examples described herein may further include, that the application buffer is based on a scatter-gather list.

In Example 26, the subject matter of one of the examples 1 to 25 or any of the Examples described herein may further include, that the transport protocol is the Quick User Datagram Protocol Internet Connections, QUIC, protocol.

Example 27 relates to a method for a hardware circuit for generating data packets according to a transport protocol from an application buffer comprising a plurality of data streams, the method comprising receiving (105) metadata comprising at least one of information about data packet types supported by the transport protocol, information about an offset and a length of the supported data packet types, and information about possible stream header start positions, possible payload start positions and possible offsets in the data streams. The method comprises identifying (110) offsets in the application buffer as possible segmentation points based on the metadata. The method comprises segmenting (120) the application buffer at the possible segmentation points into segments for data packets. The method comprises generating (130) data packets according to the transport protocol based on the segments.

In Example 28, the subject matter of example 27 or any of the Examples described herein may further include, that the application buffer comprises a plurality of stream headers for the plurality of data streams, wherein at least a subset of the plurality of stream headers are replicated and used in the generation of the data packets.

In Example 29, the subject matter of example 28 or any of the Examples described herein may further include, that the application buffer comprises the replicated stream headers, the replicated stream headers originating from a software application of a computer system executing the method.

In Example 30, the subject matter of example 28 or any of the Examples described herein may further include, that the method comprises generating (140) the replicated stream headers based on the plurality of stream headers.

In Example 31, the subject matter of example 30 or any of the Examples described herein may further include, that for each stream header, the metadata comprises an indication on whether the stream header is to be replicated by the method, wherein the replicated stream header for a stream header is generated if the metadata indicates that the stream header is to be replicated by the method.

In Example 32, the subject matter of one of the examples 30 to 31 or any of the Examples described herein may further include, that the method comprises updating (150) at least one of information about a length of the payload, information about an offset of the payload and information about a checksum of the payload in the stream header and the replicated stream header.

In Example 33, the subject matter of one of the examples 28 to 32 or any of the Examples described herein may further include, that the method comprises parsing (160) the application buffer to determine information on a start and an offset for each replicated stream header, wherein the data packets are generated based on the information on the start and the offset of the replicated stream headers.

In Example 34, the subject matter of one of the examples 28 to 33 or any of the Examples described herein may further include, that the method comprises including (132) a stream header for each data packet comprising a segment of a data stream, wherein, if a data stream is spread over a first and a second data packet, a replicated stream header is included in the second data packet.

In Example 35, the subject matter of example 34 or any of the Examples described herein may further include, that the metadata comprises information on a start and an offset for each replicated stream header, wherein the replicated stream header is included in the second data packet based on the information on the start and the offset of the respective stream header.

In Example 36, the subject matter of one of the examples 28 to 35 or any of the Examples described herein may further include, that the metadata further comprises information about a maximum segment size, wherein the replicated stream headers are inserted based on the maximum segment size.

In Example 37, the subject matter of one of the examples 27 to 36 or any of the Examples described herein may further include, that data streams of the plurality of data streams comprise one or more stream segments, wherein the method comprises parsing (160) the application buffer to determine information on a payload start and offset for each stream segment, wherein the offsets are identified based on the information on the payload start and offset.

In Example 38, the subject matter of one of the examples 27 to 37 or any of the Examples described herein may further include, that the transport protocol is based on two or more levels of headers, the two or more levels comprising at least one level of stream headers and at least one level of transport protocol headers.

In Example 39, the subject matter of one of the examples 27 to 38 or any of the Examples described herein may further include, that data streams of the plurality of data streams comprise one or more stream segments, wherein the metadata comprises information on a payload start and offset for each stream segment, wherein the offsets are identified based on the information on the payload start and offset.

In Example 40, the subject matter of one of the examples 27 to 39 or any of the Examples described herein may further include, that the application buffer comprises a start packet number to be used for the data packets, wherein the data packets are generated with packet numbers starting from the start packet number.

In Example 41, the subject matter of one of the examples 27 to 40 or any of the Examples described herein may further include, that the application buffer further comprises a transport protocol header, and wherein generating the data packets comprises generating the data packets to comprise the transport protocol header.

In Example 42, the subject matter of example 41 or any of the Examples described herein may further include, that the transport protocol header comprises at least one of Media Access Control information, Internet Protocol information, User Datagram Protocol information, Transmission Control Protocol information and information about a packet number.

In Example 43, the subject matter of one of the examples 27 to 42 or any of the Examples described herein may further include, that generating the data packets comprises generating the data packets to comprise information about a checksum for payload in the respective data packet.

In Example 44, the subject matter of example 43 or any of the Examples described herein may further include generating (170) the checksum.

In Example 45, the subject matter of one of the examples 27 to 44 or any of the Examples described herein may further include, that if a possible segmentation point between a first portion of a payload of one of the plurality of data streams and a second portion of the payload of one of the plurality of data streams is identified, the method may comprise generating the data packets comprises generating (134) a first data packet comprising the first portion of the payload and the stream header of the one of the plurality of data streams, and that the method may comprise generating (136) a second data packet comprising the second portion of the payload and a replication of the stream header of the one of the plurality of data streams.

In Example 46, the subject matter of example 45 or any of the Examples described herein may further include, that generating the data packets further comprises updating (150) information about a length of the payload in the stream header and the replication of the stream header.

In Example 47, the subject matter of one of the examples 45 to 46 or any of the Examples described herein may further include, that generating the data packets further comprises generating the first data packet and the second data packet to comprise information about a respective packet number.

In Example 48, the subject matter of one of the examples 27 to 47 or any of the Examples described herein may further include, that the metadata further comprises information about a maximum segment size, and wherein identifying offsets in the application buffer comprises identifying an offset in the application buffer as possible segmentation point only if a size of a segment defined by the offset is at maximum the maximum segment size.

In Example 49, the subject matter of one of the examples 27 to 48 or any of the Examples described herein may further include, that generating data packets comprises padding (180) the segments if the metadata comprises information that segments of the application buffer that are smaller in size than a maximum segment size are to be padded.

In Example 50, the subject matter of one of the examples 27 to 49 or any of the Examples described herein may further include, that the application buffer further comprises transport protocol management data elements, and wherein, if a segment comprises a transport protocol management data element smaller than a maximum segment size, generating the data packets comprises padding (180) the transport protocol management data element or ending the data packet after the transport protocol management data element.

In Example 51, the subject matter of one of the examples 27 to 50 or any of the Examples described herein may further include, that the application buffer is based on a scatter-gather list.

In Example 52, the subject matter of one of the examples 27 to 51 or any of the Examples described herein may further include, that the transport protocol is the Quick User Datagram Protocol Internet Connections, QUIC, protocol.

Example 53 relates to an apparatus (20) for processing an application buffer (30) comprising a plurality of data streams, the apparatus comprising an input circuit (22) configured to obtain metadata comprising at least one of information about data packet types supported by the transport protocol, information about an offset and a length of the supported data packet types, and information about possible stream header start positions, possible payload start positions and possible offsets in the data streams. The apparatus (20) comprises a parsing circuit (24) configured to identify offsets in the application buffer as possible segmentation points based on the metadata. The parsing circuit is configured to identify the stream headers of the plurality of data streams. The parsing circuit is configured to identify insert replicated stream headers into the application buffer after the possible segmentation points based on the identified stream headers and/or add an indication on whether the stream headers are to be replicated by an apparatus for generating data packets to the metadata.

In Example 54, the subject matter of example 53 or any of the Examples described herein may further include, that the parsing circuit is configured to determine, for the identified stream headers, whether the stream headers are to be replicated by the apparatus for generating data packets or by the apparatus for processing the application buffer, and to add the indication on whether the stream headers are to be replicated by an apparatus for generating data packets to the metadata accordingly.

In Example 55, the subject matter of one of the examples 53 to 54 or any of the Examples described herein may further include, that the parsing circuit is configured to generate the replicated stream headers based on the identified stream headers.

In Example 56, the subject matter of example 55 or any of the Examples described herein may further include, that the parsing circuit is configured to update at least one of information about a length of the payload, information about an offset of the payload and information about a checksum of the payload in the stream header and the replicated stream header.

In Example 57, the subject matter of one of the examples 53 to 56 or any of the Examples described herein may further include, that the parsing circuit is configured to parse the application buffer to determine information on a start and an offset for each replicated stream header, wherein the parsing circuit is configured to add the information on the start and the offset to the metadata.

In Example 58, the subject matter of one of the examples 53 to 57 or any of the Examples described herein may further include, that data streams of the plurality of data streams comprise one or more stream segments, wherein the parsing circuit is configured to parse the application buffer to determine information on a payload start and offset for each stream segment, wherein the parsing circuit is configured to add information on the payload start and offset to the metadata.

Example 59 relates to a method for processing an application buffer comprising a plurality of data streams, the method comprising obtaining (205) metadata comprising at least one of information about data packet types supported by the transport protocol, information about an offset and a length of the supported data packet types, and information about possible stream header start positions, possible payload start positions and possible offsets in the data streams. The method comprises identifying (210) offsets in the application buffer as possible segmentation points based on the metadata. The method comprises identifying (220) the stream headers of the plurality of data streams. The method comprises inserting (230) replicated stream headers into the application buffer after the possible segmentation points based on the identified stream headers and/or adding (240) an indication on whether the stream headers are to be replicated by an apparatus for generating data packets to the metadata.

In Example 60, the subject matter of example 59 or any of the Examples described herein may further include, that the method comprises determining (250), for the identified stream headers, whether the stream headers are to be replicated by the method or an apparatus for generating data packets or by the method or an apparatus for processing the application buffer, and adding the indication on whether the stream headers are to be replicated by a method or apparatus for generating data packets to the metadata accordingly.

In Example 61, the subject matter of one of the examples 59 to 60 or any of the Examples described herein may further include, that the method comprises generating (260) the replicated stream headers based on the identified stream headers.

In Example 62, the subject matter of example 61 or any of the Examples described herein may further include, that the method comprises updating (270) at least one of information about a length of the payload, information about an offset of the payload and information about a checksum of the payload in the stream header and the replicated stream header.

In Example 63, the subject matter of one of the examples 59 to 62 or any of the Examples described herein may further include, that the method comprises parsing (280) the application buffer to determine information on a start and an offset for each replicated stream header, wherein the method comprises adding the information on the start and the offset to the metadata.

In Example 64, the subject matter of one of the examples 59 to 63 or any of the Examples described herein may further include, that data streams of the plurality of data streams comprise one or more stream segments, wherein the method comprises parsing (280) the application buffer to determine information on a payload start and offset for each stream segment, wherein the method comprises adding information on the payload start and offset to the metadata.

Example 65 relates to a machine readable storage medium including program code, when executed, to cause a machine to perform the method according to one of the examples 27 to 52 or 59 to 64.

Example 66 relates to a computer program having a program code for performing the method of at least one of the claims 27 to 52 or 59 to 64, when the computer program is executed on a computer, a processor, or a programmable hardware component.

Example 67 relates to a machine readable storage including machine readable instructions, when executed, to implement a method or realize an apparatus as claimed in any pending claim or introduced in any example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for generating data packets according to the Quick User Datagram Protocol Internet Connections (QUIC) protocol, the apparatus comprising:
    circuitry configured to provide QUIC segmentation offloading support, by:
        identifying offsets in an at least one data stream as possible segmentation points based on metadata, wherein the at least one data stream is to be transmitted using the QUIC protocol;
        splitting the at least one data stream at the possible segmentation points into segments for data packets;
        generating data packets from the segments; and
        prepending a QUIC header to each data packet,
    wherein the circuitry comprises input circuitry that is configured to receive the metadata and parsing circuitry configured to split the data stream based on the metadata.

2. The apparatus according to claim 1, wherein the circuitry is configured to replicate the QUIC header for use in the data packets, and to update a packet number in the QUIC header for each data packet.

3. The apparatus according to claim 2, wherein the QUIC header being replicated comprises a User Datagram Protocol header.

4. The apparatus according to claim 1, wherein the circuitry is configured to obtain the at least one data stream from an application buffer.

5. The apparatus according to claim 4, wherein the application buffer comprises, for each data stream, a stream header, wherein the circuitry is configured to replicate the stream header if a data stream is split across multiple segments, and to update information on the length of the payload in the respective stream headers according to the segmentation.

6. The apparatus according to claim 5, wherein the circuitry is configured to update information the offset of the payload and/or information on a checksum of the payload in the respective stream headers.

7. The apparatus according to claim 5, wherein the circuitry is configured to replicate the stream header based on an indication on whether the stream header is to be replicated that is included in metadata being used to perform the QUIC segmentation offloading.

8. The apparatus according to claim 4, wherein the application buffer comprises a start packet number to be used for the data packets, wherein the circuitry is configured to generate the data packets with packet numbers starting from the start packet number.

9. The apparatus according to claim 1, wherein the circuitry is configured to split the at least one data stream based on information on a length of data packet types supported by the QUIC protocol.

10. The apparatus according to claim 1, wherein the metadata comprises at least one of information about data packet types supported by the transport protocol, information about an offset and a length of the supported data packet types, and information about possible stream header start positions, possible payload start positions and possible offsets in data streams.

11. The apparatus according to claim 1, wherein the circuitry is configured to generate the data packets to comprise information about a checksum for payload in the respective data packet, and to generate the checksum.

12. A Network Interface Controller (NIC) comprising the apparatus according to claim 1.

13. A method for generating data packets according to the Quick User Datagram Protocol Internet Connections (QUIC) protocol, the method comprising:
performing, by a network interface controller, QUIC segmentation offloading, by:
receiving, by input circuitry, metadata,
identifying offsets in an at least one data stream as possible segmentation points based on the metadata, wherein the at least one data stream is to be transmitted using the QUIC protocol,
splitting, by parsing circuitry, the at least one data stream at the possible segmentation points into segments for data packets,
generating data packets from the segments, and
prepending a QUIC header to each data packet.

14. The method according to claim 13, wherein the method comprises, by the network interface controller, replicating the QUIC header for use in the data packets, and updating a packet number in the QUIC header for each data packet.

15. The method according to claim 14, wherein the QUIC header being replicated comprises a User Datagram Protocol header.

16. The method according to claim 13, wherein the method comprises, by the network interface controller, obtaining the at least one data stream from an application buffer, the application buffer comprising, for each data stream, a stream header, replicating the stream header if a data stream is split across multiple segments, and updating information on the length of the payload in the respective stream headers according to the segmentation.

17. The method according to claim 13, wherein the method comprises, by the network interface controller, generating the data packets with information about a checksum for payload in the respective data packet, and generating the checksum.

* * * * *